UNITED STATES PATENT OFFICE.

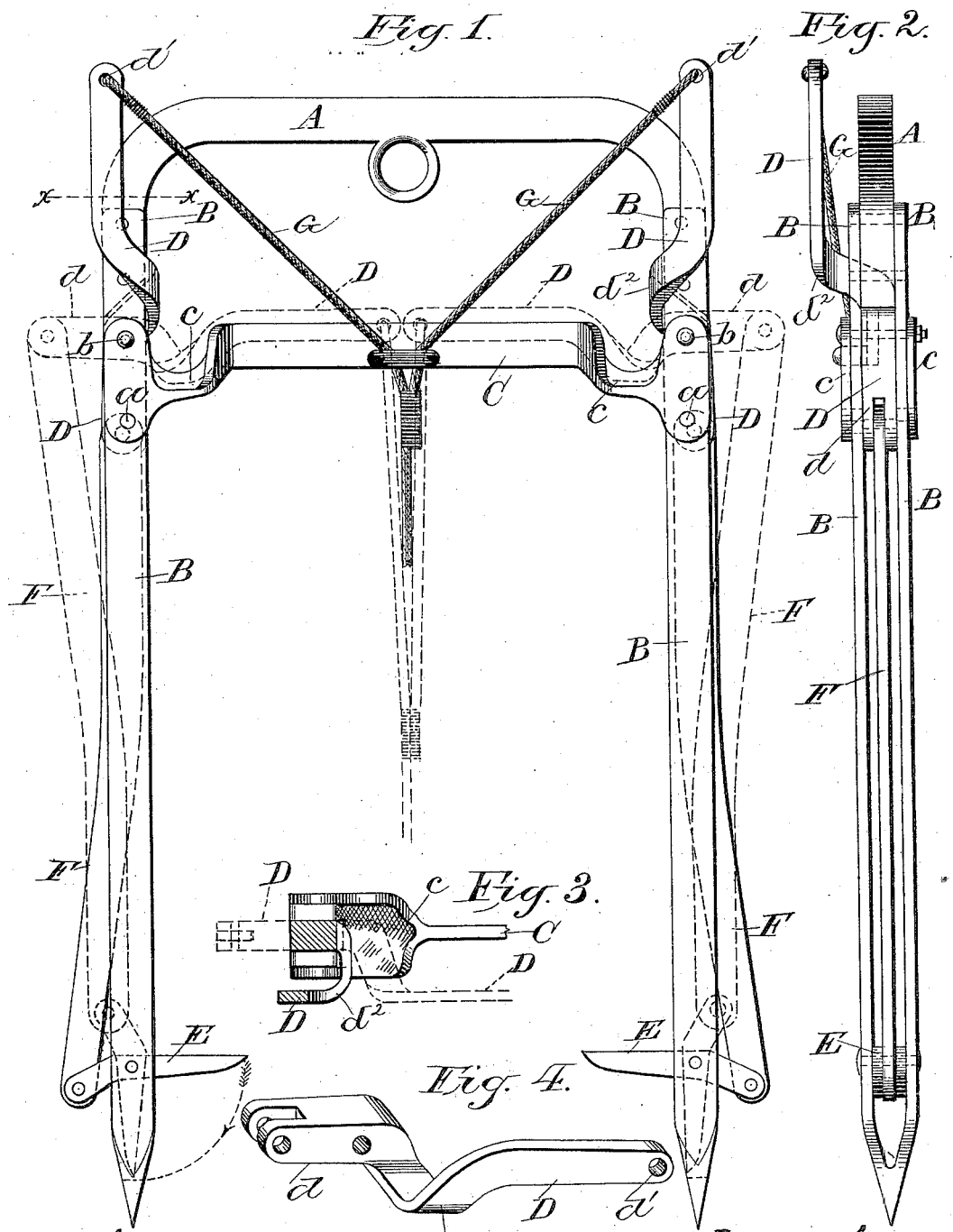

FRED A. DENNETT, OF MILWAUKEE, WISCONSIN.

HORSE HAY-FORK.

SPECIFICATION forming part of Letters Patent No. 311,728, dated February 3, 1885.

Application filed May 31, 1884. (No model.)

*To all whom it may concern:*

Be it known that I, FRED A. DENNETT, of Milwaukee, in the county of Milwaukee, and in the State of Wisconsin, have invented certain new and useful Improvements in Hay-Forks; and I do hereby declare that the following is a full, clear, and exact description thereof.

My invention relates to hay-forks, and will be fully described hereinafter.

In the drawings, Figure 1 is a front elevation of my improved hay-fork. Fig. 2 is an edge view of the same. Figs. 3 and 4 are details, the former being a section on the line $x\,x$ of Fig. 1.

A is the bail of my fork, and B are the legs. The bail is of inverted-U shape, and the legs each consist of two flat straps of iron joined together at their lower ends by a point, which is usually welded to them. An end of the bail fits between the upper ends of the sides of each leg, and is secured therein by suitable rivets.

C is a brace that serves to hold the legs B apart. This brace is bifurcated at its ends, and a leg is secured between each bifurcation by rivets $a$ and bolts $b$, the latter serving as pivots for the lever-arms D D. Near the point of each leg, and between its members, a tine, E, is pivoted, and the outer end of this tine, which is bent at an obtuse angle to its inner end, is connected by curved links F with the outer end, $d$, of lever-arm D. Each of the lever-arms D has a handle, which is perforated at $d'$ to receive one of the operating cords or chains, G, and this handle is joined to the end $d$ by the curved portion $d^2$, which, when the handle is in the position shown in full lines in the drawings, rests against the inner edge of the legs, just above the brace, but, when the lever has been drawn down to the position shown in the dotted lines, rests in a recess, $c$, in the brace C.

In operation my fork differs very slightly from the well-known double-harpoon fork. By draft on the cords or chains G the lever-arms are thrown into the position shown in dotted lines and the tines are drawn in between the sides of the legs. The fork is then thrust into the hay and the levers drawn by hand into the position shown in full lines. This throws the tines out into the hay and carries their outer ends below a dead-center, so that the bars F form braces, which, acting between the ends $d$ of the lever-arms D D and the outer end of the harpoon-tines E E, lock the latter with its inner end in the hay, which will be held firmly thereby until the handles of the lever-arms are depressed by the attendant far enough to cause the curved links F to raise the outer ends of their tines above the center upon which they turn, when the weight of the load will force them into the position shown in dotted lines, and the hay will be released.

By the use of the curved lever-arms D and the brace C, having recesses to receive the curves, I am enabled to greatly reduce the height of bail without diminishing the capacity of the fork, and also to permit the handles of the levers D to be carried outside of the bail, where they can be easily reached and operated.

Having thus described my invention, what I claim as new, and desire to secure by Letters Patent, is—

1. In a hay-fork, the combination, with the legs and bail, of the brace having a recess in each end, the curved operating-levers and the tines connected therewith.

2. In a hay-fork, the operating-levers, each of which has two approximately-straight portions joined by a curved portion, $d^2$, in combination with the tines and the legs, as and for the purpose set forth.

In testimony that I claim the foregoing I have hereunto set my hand, at Milwaukee, in the county of Milwaukee and State of Wisconsin, in the presence of two witnesses.

FRED A. DENNETT.

Witnesses:
STANLEY S. STOUT,
H. G. UNDERWOOD.